(12) United States Patent
Geddes et al.

(10) Patent No.: US 12,309,523 B2
(45) Date of Patent: May 20, 2025

(54) VIDEO STREAM SEGMENTATION FOR QUALITY RETENTION DURING REDUCED-BANDWIDTH VIDEO CONFERENCING

(71) Applicant: Zoom Communications, Inc., San Jose, CA (US)

(72) Inventors: Graeme Lambourne Geddes, Aliso Viejo, CA (US); Shawn Michael Rolin, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 135 days.

(21) Appl. No.: 17/730,127

(22) Filed: Apr. 26, 2022

(65) Prior Publication Data

US 2023/0344957 A1    Oct. 26, 2023

(51) Int. Cl.
| | |
|---|---|
| *H04N 5/272* | (2006.01) |
| *H04L 43/0864* | (2022.01) |
| *H04L 43/087* | (2022.01) |
| *H04N 7/14* | (2006.01) |
| *H04N 7/15* | (2006.01) |

(52) U.S. Cl.
CPC ......... *H04N 5/272* (2013.01); *H04L 43/0864* (2013.01); *H04L 43/087* (2013.01); *H04N 7/147* (2013.01); *H04N 7/15* (2013.01)

(58) Field of Classification Search
CPC ..... H04N 5/272; H04N 7/147; H04L 43/0864
See application file for complete search history.

(56) References Cited

U.S. PATENT DOCUMENTS

| | | | |
|---|---|---|---|
| 5,345,313 | A  | 9/1994 | Blank |
| 6,122,013 | A  | 9/2000 | Tamir et al. |
| 6,829,391 | B2 | 12/2004 | Comaniciu et al. |
| 7,999,862 | B2 | 8/2011 | Mack et al. |
| 8,773,494 | B2 | 7/2014 | Barkley et al. |
| 8,780,204 | B2 | 7/2014 | DeAngelis et al. |

(Continued)

OTHER PUBLICATIONS

Ganguly et al., "Non-Real Time Content Scheduling in Wireless Data Networks", International Symposium on Personal, Indoor and Mobile Radio Communications, Sep. 5, 2004. (1375-1379 pages).

(Continued)

*Primary Examiner* — Amal S Zenati
(74) *Attorney, Agent, or Firm* — Young Basile Hanlon & MacFarlane, P.C.

(57) ABSTRACT

During a video conference, a bandwidth reduction affecting a conference participant represented by a video stream without a virtual background is detected. Based on the bandwidth reduction, the video stream is segmented into a background and a foreground, in which the foreground depicts the conference participant. A resolution of the background is decreased while maintaining a resolution of the foreground. An adjusted video stream including the background at the decreased resolution and the foreground at the maintained resolution is then transmitted for rendering within a user interface of the video conference. Accordingly, portions of a video stream depicting a conference participant can be maintained at an initial quality level while adjusting other portions of the video stream to address network issues affecting a computing device of the conference participant.

20 Claims, 10 Drawing Sheets

(56) References Cited

U.S. PATENT DOCUMENTS

| | | |
|---|---|---|
| 9,232,189 B2 | 1/2016 | Shaburov et al. |
| 9,641,888 B2 | 5/2017 | Kerns et al. |
| 10,116,901 B2 | 10/2018 | Shaburov et al. |
| 10,540,007 B2 | 1/2020 | Tiana et al. |
| 10,595,069 B2 | 3/2020 | Swaminathan et al. |
| 11,082,661 B1 | 8/2021 | Pollefeys |
| 11,290,682 B1 | 3/2022 | Shaburov et al. |
| 11,601,618 B1 | 3/2023 | Slotznick |
| 12,069,121 B1 | 8/2024 | Garcia et al. |
| 2002/0064314 A1 | 5/2002 | Comaniciu et al. |
| 2002/0098800 A1 | 7/2002 | Frazita et al. |
| 2003/0030652 A1 | 2/2003 | Billmaier et al. |
| 2006/0062216 A1 | 3/2006 | Li et al. |
| 2006/0117343 A1 | 6/2006 | Novak et al. |
| 2009/0196219 A1 | 8/2009 | Chin et al. |
| 2011/0169959 A1 | 7/2011 | DeAngelis et al. |
| 2012/0327051 A1 | 12/2012 | Davies |
| 2014/0320660 A1 | 10/2014 | DeAngelis et al. |
| 2015/0195491 A1 | 7/2015 | Shaburov et al. |
| 2016/0366465 A1 | 12/2016 | Kerns et al. |
| 2017/0019633 A1* | 1/2017 | Shaburov ............. G06V 40/161 |
| 2017/0255257 A1 | 9/2017 | Tiana et al. |
| 2018/0041788 A1 | 2/2018 | Wang et al. |
| 2019/0364259 A1 | 11/2019 | Chen et al. |
| 2020/0106821 A1* | 4/2020 | Kuwata ................ H04N 19/154 |
| 2020/0234406 A1 | 7/2020 | Ren et al. |
| 2021/0297715 A1 | 9/2021 | Oz |
| 2022/0150295 A1 | 5/2022 | Pather et al. |
| 2022/0280857 A1 | 9/2022 | Watterson |

OTHER PUBLICATIONS

Wallace Jackson "Beginning Java 8 Games Development", Apress Publishing, Nov. 27, 2014.

* cited by examiner

VIDEO STREAM SEGMENTATION FOR QUALITY RETENTION DURING REDUCED-BANDWIDTH VIDEO CONFERENCING

FIELD

This disclosure generally relates to quality retention during video conferencing, and, more specifically, to decreasing a quality output of a background segmented from a video stream of a conference participant based on detection of a reduced bandwidth affecting the conference participant while maintaining a high quality output of a foreground depicting the conference participant and segmented from the video stream.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
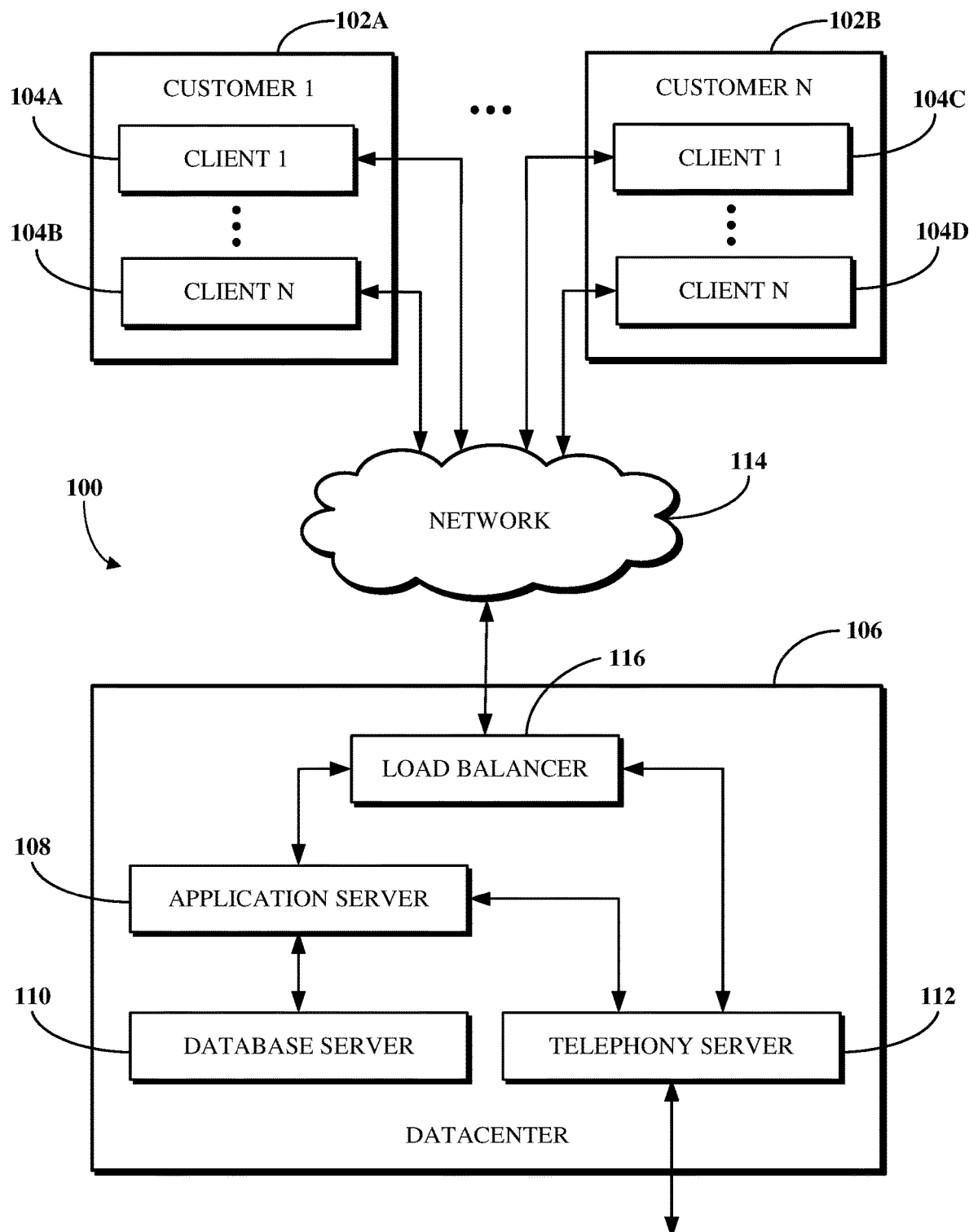
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conventional conferencing software approaches allow a conference participant to use a virtual background to replace an actual background of the conference participant within a video stream. To use a virtual background, object detection software detects the conference participant as a foreground portion of the video stream captured using the conference participant's camera. The conference participant is clipped out of each video frame of the video stream and combined onto the virtual background image to generate a composite image, which is then transmitted as a video frame of the video stream for rendering within a conferencing software user interface. Use of virtual backgrounds during video conferences is popular for security and privacy purposes, such as to prevent other conference participants from observing sensitive or private content that may be within the field of view of a camera used to capture a video stream for a participant.

However, at some point during a conference, the conference participant may experience bandwidth limitations (e.g., due to local network issues, regional outages, or hardware or software failures). Conventional conferencing software approaches respond to such bandwidth limitations by decreasing the resolution of the entire video stream of a subject conference participant. Thus, where a virtual background is used, the entire composite image is scaled down in resolution, thereby resulting in a noticeable quality drop for both the virtual background and the foreground that depicts the conference participant themselves. Given that the focus of other conference participants' attention is almost always on a conference participant and not their virtual background, such conventional approaches to resolving bandwidth limitations by scaling down an entire video stream are overreaching and ultimately cause the quality of the video sharing experience to suffer more than is necessary.

Implementations of this disclosure address problems such as these by detecting a bandwidth reduction for a conference participant who is using a virtual background to participate in a video conference and by, based on the detected bandwidth reduction, adjusting the virtual background used by the conference participant without also adjusting a foreground depicting the conference participant, such as by decreasing a resolution of the virtual background without also decreasing a resolution of the foreground. When a bandwidth reduction is detected for a conference participant, the current resolution of the video stream is maintained for the foreground of the video stream while that current resolution is decreased for the virtual background of the video stream. For example, a client at which a bandwidth reduction is detected may, based on the amount of the bandwidth reduction, decrease a resolution of the virtual background used to generate composite images from 720p to 90p in order to maintain the foreground depicting the conference participant at the original resolution of 720p within the composite images.

In some cases, a conference participant may not be using a virtual background to participate in a video conference. For example, the video stream transmitted from the conference participant's device for rendering within the user interface of the conferencing software may represent the video captured at that device. According to implementations of this disclosure, where a bandwidth reduction affecting such a conference participant is detected, the video stream is segmented into a background and a foreground, in which the foreground is the portion of the video stream images depicting the conference participant and the background is the remaining portion of the video stream images. The background may then be treated as a virtual background described above, such as by the background being adjusted (e.g., by a decrease in a resolution of the background) without also adjusting the foreground (e.g., while maintaining a resolution of the foreground).

To describe some implementations in greater detail, reference is first made to examples of hardware and software structures used to implement a system for detecting a bandwidth reduction affecting a conference participant and adjusting one or more portions of a video stream based on the bandwidth reduction. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
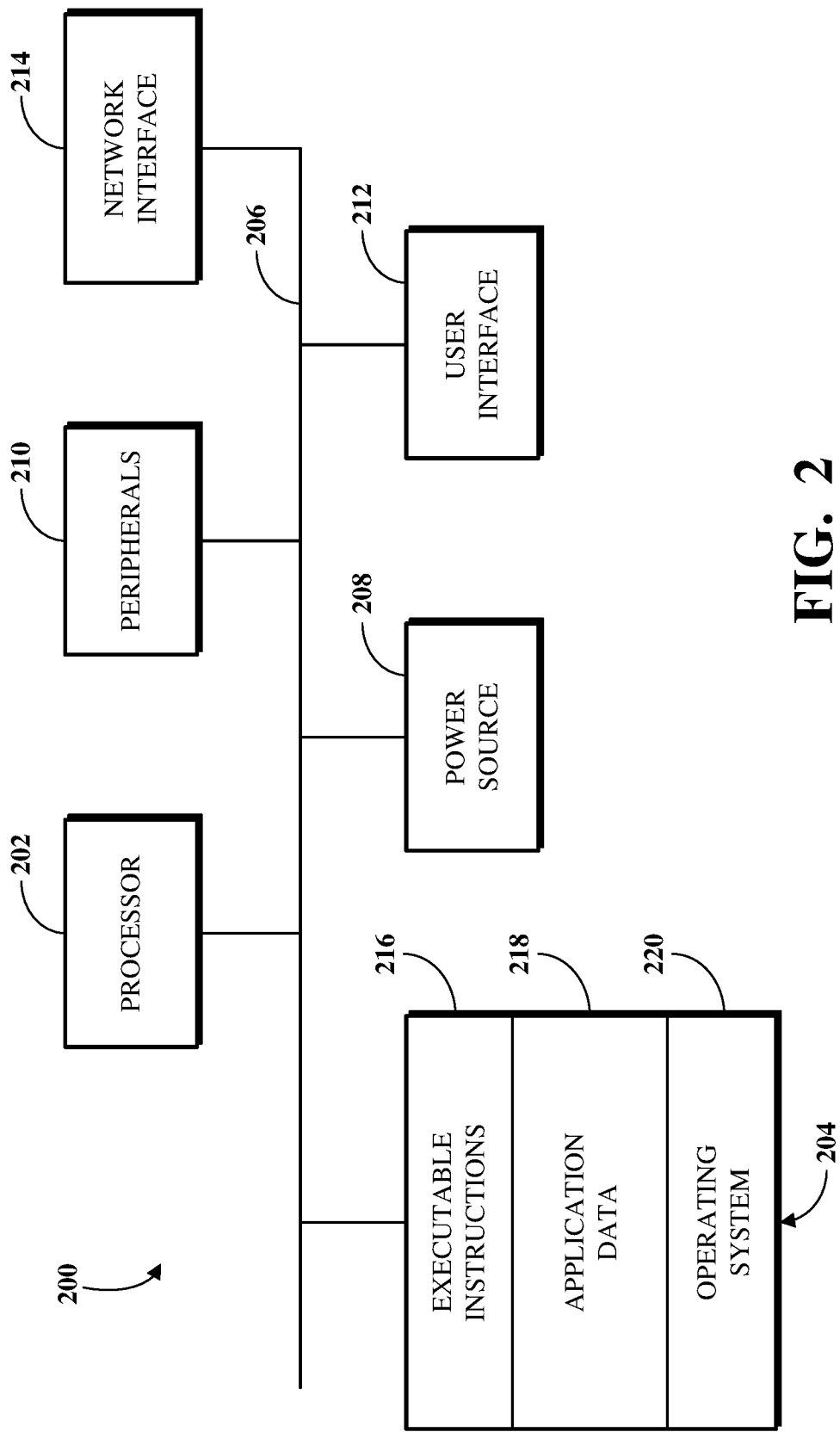
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
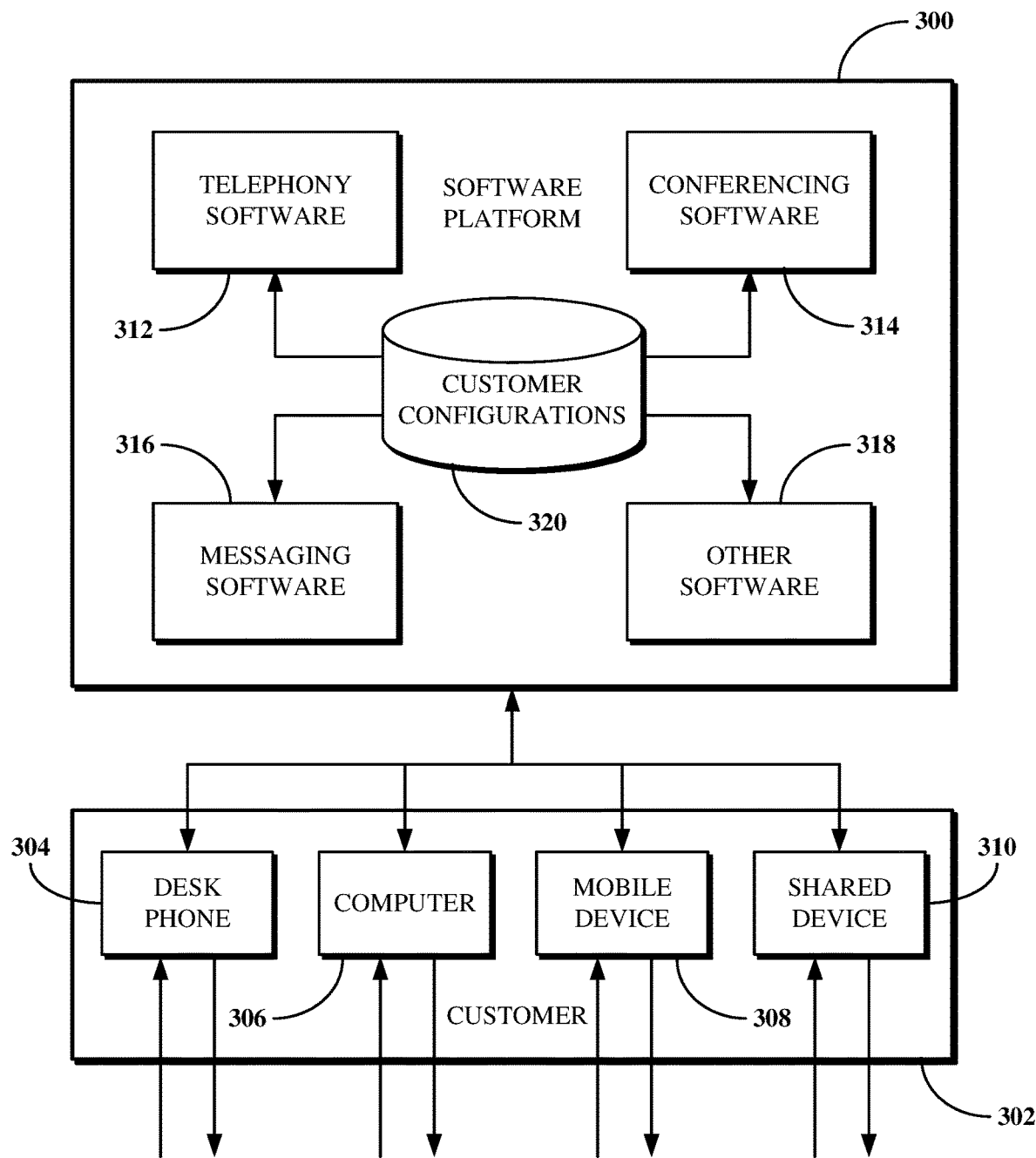
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for detecting a bandwidth reduction affecting a conference participant and adjusting one or more portions of a video stream based on the bandwidth reduction. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
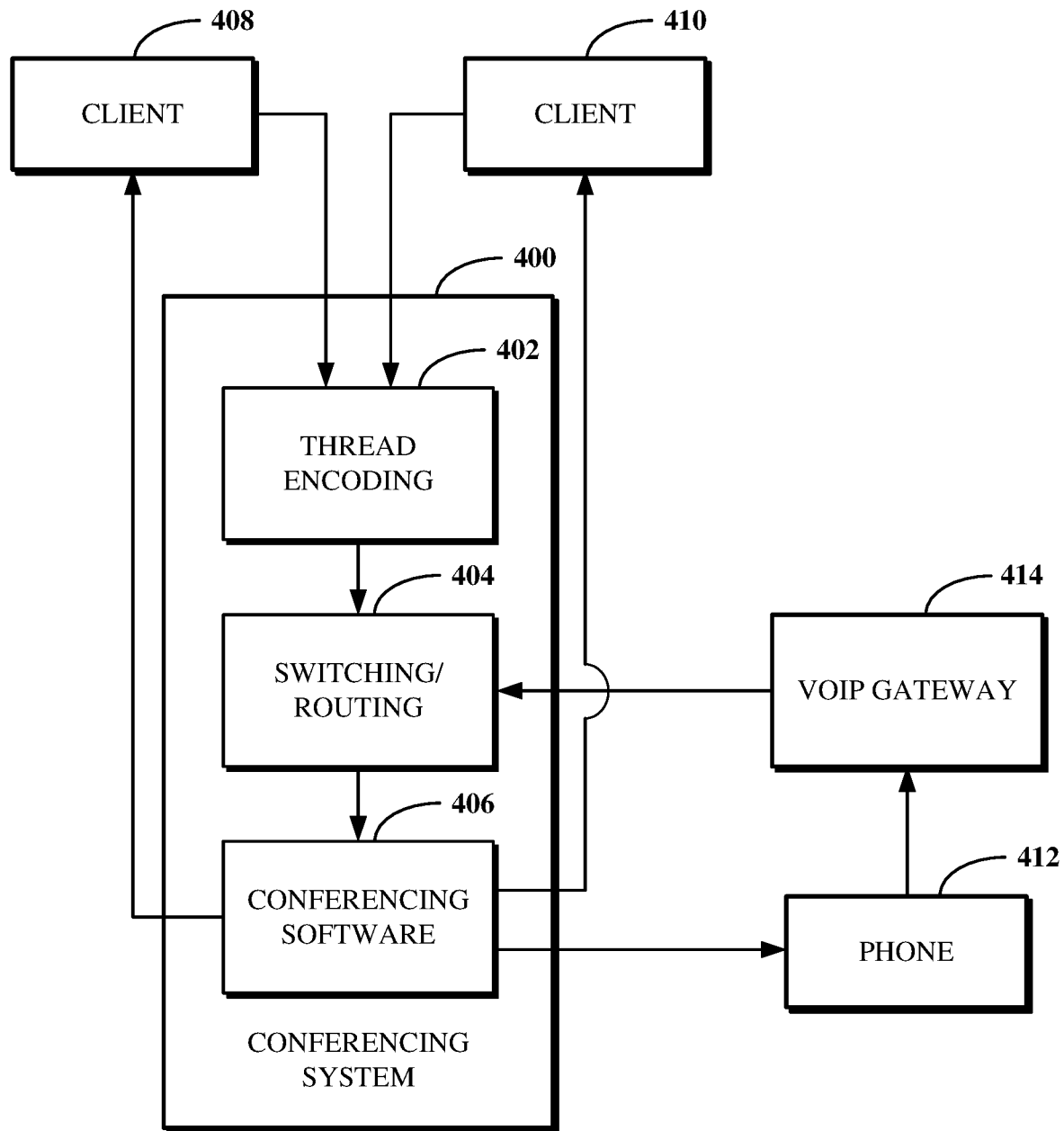
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, be the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface.

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video feed for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between users of those participants. Those other software services may be implemented at the conferencing system 400 and/or a different aspect of the system 100.

Figure 5:
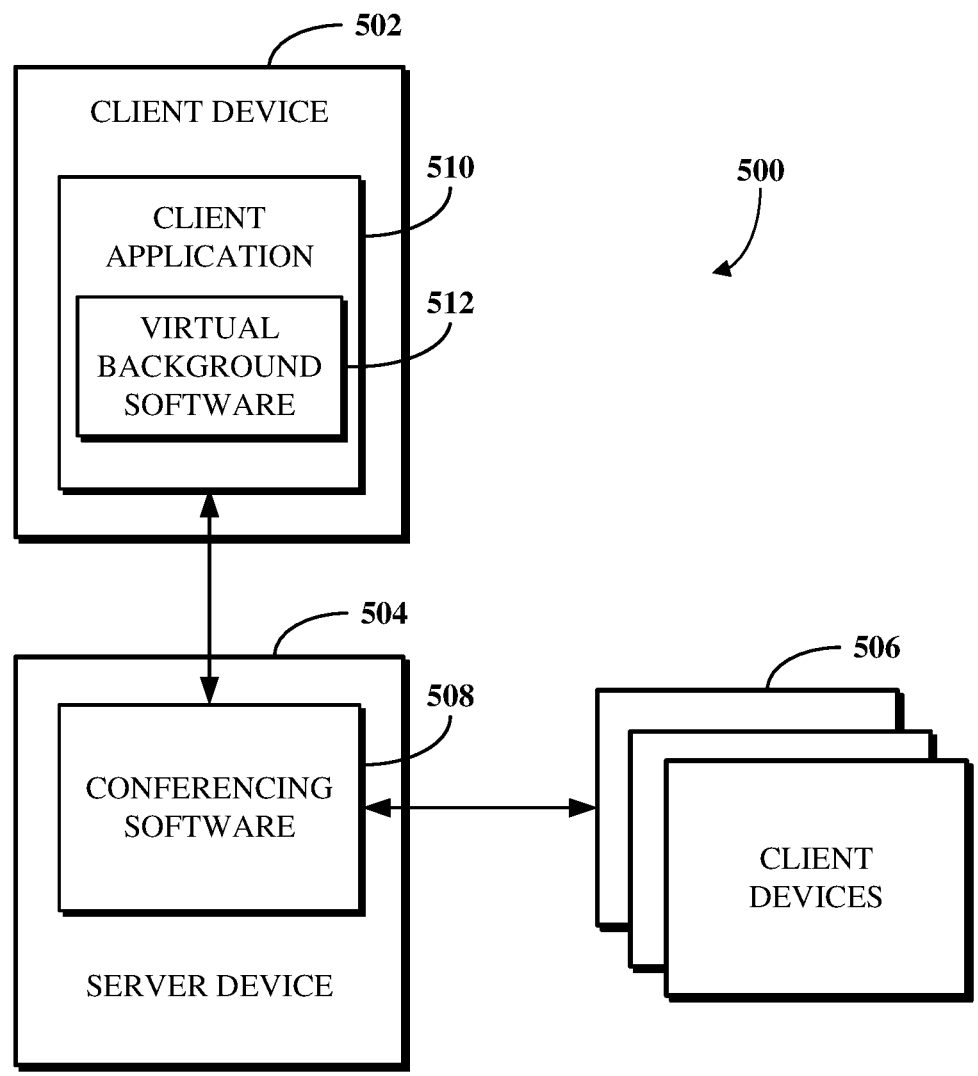
FIG. 5 is a block diagram of an example of a system for detecting a bandwidth reduction affecting a conference participant and adjusting one or more portions of a video stream based on the bandwidth reduction.

FIG. 5 is a block diagram of an example of a system 500 for detecting a bandwidth reduction affecting a conference participant and adjusting one or more portions of a video stream based on the bandwidth reduction. The system 500 includes a client device 502, a server device 504, and other client devices 506. Each of the client device 502 and the other client devices 506 may, for example, be one of the clients 408 or 410 shown in FIG. 4. The client devices 502 and the other client devices 506 are devices used by conference participants to connect to and participate in a video conference implemented by conferencing software 508 at the server device 504. The conferencing software 508 may, for example, be the conferencing software 406 shown in FIG. 4. The client device 502 connects to the conferencing software 508 using a client application 510. The client application 510 may, for example, be a desktop software application, mobile application, or web application associated with one or more services of a software platform, for example, the software platform 300 shown in FIG. 3. For example, the client application 510 may be software that allows a user of the client device 502 to access or otherwise use one or more of the software 312 through 318 shown in FIG. 3. The other client devices 506 may be understood to each also include a client application (not shown) that connects them to a video conference implemented using the conferencing software 508.

A client application used by a client device to connect to a video conference implemented using the conferencing software 508 may include software for configuring, applying, modifying, and/or otherwise using a virtual background. As shown, the client application 510 at the client device 502 includes virtual background software 512. For example, the virtual background software 512 may be or otherwise refer to functionality of the client application 510 related to virtual backgrounds. In another example, the virtual background software 512 may be or otherwise refer to software run by or for the client application (e.g., functions, routines, or other instructions invoked, interpreted, executed, or otherwise run in connection with the client application 502). In some implementations, however, the virtual background software 512 may be separate from the client application 510. The virtual background software 512 enables a user of the client device 502, who is a conference participant of a video conference implemented using the conferencing software 508, to use a virtual background to replace an actual background initially depicted within images of a video stream captured by a camera of the client device 502. In some cases, the user of the client device 502 may select the virtual background. In some cases, the virtual background may be a default virtual background selected by the client application 502 or the virtual background software 512.

The virtual background software 512 performs a segmentation process to effectively clip out, from the images of the video stream captured by the camera of the client device 502, a portion of the images depicting the conference participant (i.e., the user of the client device 502) and to combine that clipped out portion with the virtual background to produce composite images depicting both the virtual background and the conference participant. To combine the clipped out portion with the virtual background, the clipped out portion is treated as a foreground that remains layered on top of the virtual background such that content of the virtual background which is behind the foreground may not be perceptible. The client application 510 obtains the composite images from the virtual background software 512 and transmits them as the video stream for the conference participant to the conferencing software 508. A virtual background may be applied for use with a video conference before a conference participant joins the video conference. Alternatively, a virtual background may be applied during the video conference, for example, based on a selection by or instruction received from the conference participant.

The conferencing software 508 processes the video streams received from the various conference participants' devices (e.g., the client device 502 and the other client devices 506) and transmits processed video stream data back to those devices to cause those devices to render the processed video stream data within a user interface of the conferencing software 508 at each of the devices. For example, the user interface of the conferencing software 508 may include multiple user interface tiles each displaying a rendered video showing one or more of the conference participants. The size of a user interface tile may depend on one or more factors including the view style set for the user interface of the conferencing software 508 at a given time and whether the one or more conference participants represented by the user interface tile are active speakers at a given time. The view style for the user interface of the conferencing software 508, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the user interface of the conferencing software 508.

The client device 502 and the other client devices 506 may be located in a same physical space (e.g., a conference room), different physical spaces within a same geographic area (e.g., separate offices at an office premises), or in different geographic areas (e.g., separate locations, regardless of distance). The client device 502 and the other client devices 506 connect to the server 504, and thus the client application 510 and client applications running at the other client devices 506 connect to the conferencing software 508, over a network, which may, for example, be the network 114 shown in FIG. 1. These connections thus rely on the performance of hardware, software, and/or other infrastructure that implements the network 114, both on a micro-level (e.g., at each specific location of the client device 502 and the other client devices 506) and on a macro-level (e.g., on a regional or national basis).

In some cases, a network issue may present that reduces the amount of bandwidth available for a client device (e.g., the client device 502) to connect to the server device 504. For example, a sudden increase in a number of devices connected to a network may limit the amount of bandwidth available for the client device 502 to use to connect to the server device 504. In another example, a breach of a threshold data usage amount or another measurement by an internet service provider may result in a reduction in the amount of bandwidth available for the client device 502 to use to connect to the server device 504. Other examples are possible, as well.

Such bandwidth reductions may occur during a video conference. Because the bandwidth reduction limits a total amount of data that can be transmitted by the client device (e.g., the client device 502) to the server device 504, the amount of data within the video stream transmitted from the client device may need to be reduced in order for the conference participant using that client device to continue participating in the video conference using video media.

A bandwidth reduction affecting a conference participant using a client device may be detected based on one or of packet loss, round trip delay latency, or jitter affecting the video stream being transmitted from the client device. A client application used to connect that client device to the server device 504 may be configured to detect a bandwidth reduction by monitoring network information associated with the client device. For example, the client application 510 may detect a bandwidth reduction affecting the conference participant using the client device 502 based on changes in the amount of data being received and/or transmitted over some time interval or changes in the amount of time required for such data to be received and/or transmitted. In some cases, the network information used to detect the bandwidth reduction may derive from the client device 502. In some cases, the network information used to detect the bandwidth reduction may derive from the server device 504. In some cases, the network information used to detect the bandwidth reduction may derive from both the client device 502 and the server device 504.

Based on a detection of a bandwidth reduction affecting the conference participant using the client device 502, the client application 510 may cause the virtual background software 512 to adjust one or more portions of the video stream being transmitted from the user device 502. In particular, the virtual background software 512 may be configured, based on a detection of a bandwidth reduction, to adjust a virtual background included in the video stream without adjusting a foreground depicting the conference participant and included in the video stream. The virtual background software 512 can be configured to adjust the virtual background based on any detected bandwidth reduction. Alternatively, because some changes in network bandwidth may generally be expected during the course of a video conference, a detected bandwidth reduction may be compared against a threshold representing a minimum amount of bandwidth reduction on which to base an adjustment to a virtual background. In such a case, the virtual background software 512 may be configured to adjust the virtual background based on the detected bandwidth reduction meeting the threshold. The threshold may, for example, be a default value applicable to multiple conference participants or a value defined based on information specific to the client device 502.

The virtual background can be adjusted in one or more ways. For example, adjusting the virtual background can include decreasing a resolution of the virtual background while maintaining a resolution of the foreground depicting the conference participant. In another example, adjusting the virtual background can include blurring the virtual background. In yet another example, where the virtual background includes motion (e.g., where the virtual background is an image sequence rather than a single image) adjusting the virtual background can include selecting one image of the image sequence to use as a static image for the virtual background, thus omitting the motion of the virtual background. The virtual background software 512 can adjust a virtual background included in the video stream transmitted from the client device 502 using one such approach or a combination of such approaches. The adjusted virtual background is then used in place of the original virtual background. Thus, once the virtual background is adjusted based on a detected bandwidth reduction, the adjusted virtual background is used to produce composite images which are then included in the video stream transmitted from the client device 502 for rendering within the user interface of the conferencing software 508. The adjustment to the virtual background, as mentioned above, are specific to the virtual background and thus do not affect the foreground which is combined with the adjusted virtual background. As a result, the foreground represented within the composite images including the adjusted virtual background appear the same as the foreground represented in the previously transmitted composite images produced before the detection of the bandwidth reduction.

With particular reference by example to the approach for adjusting a virtual background including decreasing a resolution of the virtual background while maintaining a resolution of the foreground, the initial resolution for composite images produced before a detected bandwidth reduction may be 720p. Thus, to produce such a composite image, a 720p version of the virtual background is combined with a 720p version of the foreground. When a bandwidth reduction is detected, a lower resolution version of the virtual background may be combined with the 720p version of the foreground. In some cases, a lowest resolution version of the virtual background (e.g., a 90p version) may be used based on a first detected bandwidth reduction. In other cases, lower resolution versions may be incrementally used with each of multiple detected bandwidth reductions. For example, based on a first detected bandwidth reduction, the resolution of the virtual background may be decreased by a first amount, such as from 720p to 480p, and based on a second detected bandwidth reduction, the resolution of the virtual background may be further decreased by a second amount, such as from 480p to 360p.

The client application 510 may continue to monitor for changes in bandwidth at the client device 502 after the virtual background is adjusted. In particular, where further bandwidth reductions are detected, further adjustments to the virtual background may be made, for example, to further blur the virtual background and/or to further decrease the resolution of the virtual background. Separately, where the bandwidth reduction is determined to have resolved, such as by a detection of a bandwidth available to the client device 502 increasing (e.g., by any amount or by a threshold), the virtual background can be returned to its initial state, such as by unblurring the virtual background or increasing the resolution of the virtual background. The process for adjusting a virtual background, whether based on a detected bandwidth reduction or a determination that a bandwidth reduction has resolved, may repeat one or more times throughout a video conference. However, in some implementations, to limit a frequency of perceptible quality changes, which may become distracting to conference participants, the virtual background software 512 and/or the client application 510 may impose a threshold representing a maximum number of times that a virtual background may be adjusted during a video conference. For example, the virtual background software 512 may be configured to incrementally decrease a resolution of the virtual background as necessary throughout the video conference, but also be configured to limit a number of times that the resolution of the virtual background may be increased to a threshold.

In some implementations, the video stream transmitted from the client device 502 may be referred to as including multiple layers. For example, the video stream may include a first layer (e.g., a top layer) representing the foreground and a second layer (e.g., a bottom layer) representing the virtual background. In some such implementations, the video stream may include more than two layers. For example, a video stream may include one or more additional layers other than the foreground and the virtual background, which may be between the foreground and the virtual background or on top of the foreground. Where such an additional layer is on top of the foreground, the additional layer may be referred to as the top layer, the foreground may be referred to as an intermediate layer, and the virtual background may be referred to as a bottom layer. For example, such an additional layer may include text, images, or other objects to be overlaid on top of the foreground. In some implementations, the virtual background software 512 may be configured to adjust such an additional layer in addition to or instead of a virtual background. For example, based on a detected bandwidth reduction, the resolution of both of the virtual background and text or images in a top layer depicting content other than the foreground may be decreased while maintaining the resolution of the foreground.

In some implementations, the system 500 may be used to perform adjustments based on a detected bandwidth reduction affecting a conference participant against a video stream without a virtual background. For example, where the conference participant using the client device 502 is not using a virtual background, the video stream transmitted from the client device 502 includes images captured by the camera of the client device 502 instead of composite images produced by combining portions of those images with a virtual background. In such a case, where a bandwidth reduction is detected as described above, the video stream may be segmented, such as by the virtual background software 512 or otherwise by the client application 510, into a background and a foreground in which the foreground includes the portion depicting the conference participant and the background includes the remaining portion of the video stream. The background is then adjusted without also adjusting the foreground. For example, both of the background and the foreground may initially share the same resolution (e.g., an original resolution of the video stream), and the resolution of the background may be decreased while maintaining the resolution of the foreground. An adjusted video stream including the adjusted background may then be transmitted from the client device 502 to the server device 504 for rendering within a user interface of the video conference implemented by the conferencing software 508. In some cases, once the bandwidth reduction has resolved, the resolution of the video stream including both the background and the foreground may be restored.

In some implementations, the virtual background software 512 may be implemented at the server-side instead of or in addition to at the client-side. For example, the client application 510 may communicate the video stream captured thereat, including the actual background for the video, to the server device 504 along with network information indicating bandwidth conditions of the client device 502. The virtual background software at the server device 504 may produce composite images based on the video stream and a virtual background for the conference participant associated with the user device 502. The virtual background software at the server device 504 may further adjust client virtual background at the server device 502 based on a bandwidth reduction affecting the client device 502 detected based on the network information transmitted from the client device 502.

Figure 6A:
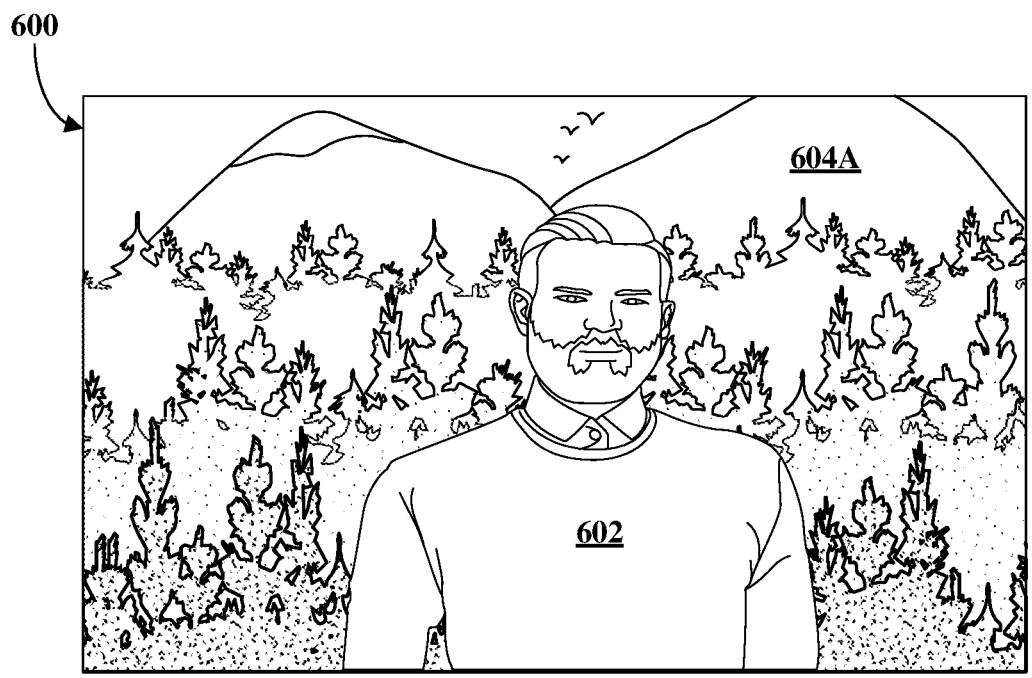
FIG. 6A is an illustration of an example of a composite image including a foreground and a virtual background output for display within a user interface of a video conference.

FIG. 6A is an illustration of an example of a composite image 600 including a foreground 602 and a virtual background 604A output for display within a user interface of a video conference. The composite image 600 is one of a sequence of images output for rendering within a user interface of a video conference implemented by conferencing software, for example, the conferencing software 508 shown in FIG. 5. The foreground 602 is a portion of the composite image 600 which depicts a conference participant. The virtual background 604A is a static or moving image selected by or for the conference participant for use with the video conference. The composite image 600 is produced by segmenting the foreground 602 from an initial image captured by a camera of a computing device associated with the conference participant and then combining the foreground 602 and the virtual background 604A.

Figure 6B:
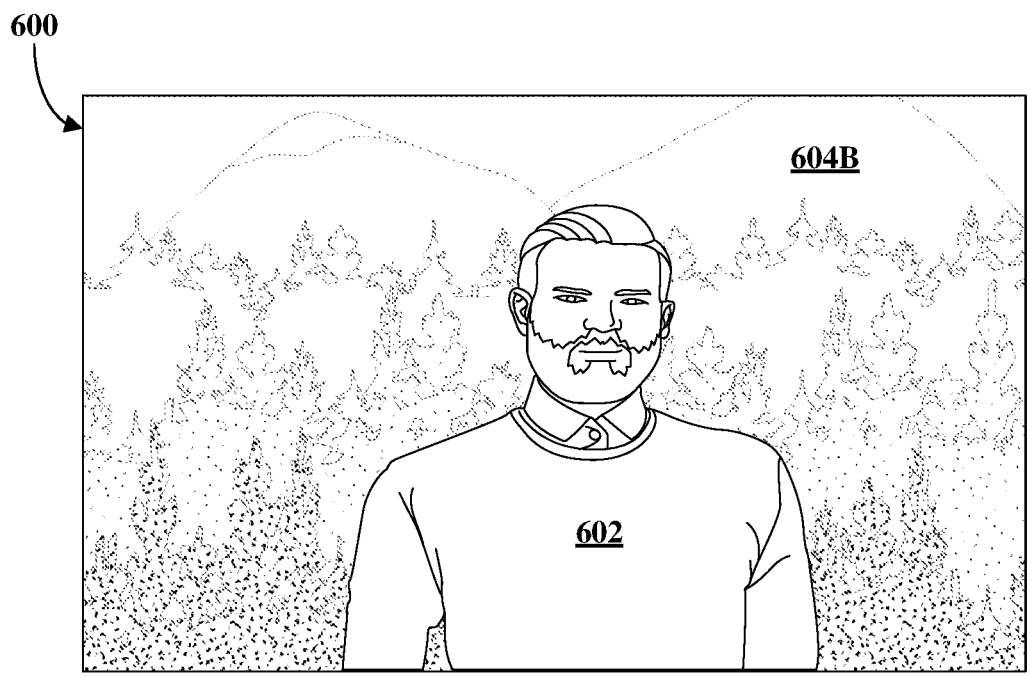
FIG. 6B is an illustration of an example of a composite image including a foreground and a virtual background adjusted based on a detected bandwidth reduction.

FIG. 6B is an illustration of an example of the composite image 600 of FIG. 6A including the foreground 602 and a virtual background 604B adjusted based on a detected bandwidth reduction. The virtual background 604B thus is a version of the virtual background 604A of FIG. 6A which has been adjusted. As shown, the virtual background 604B is a version of the virtual background 604A at a decreased resolution, demonstrated by lines making up the scenery appearing more jagged or broken and some smaller objects, such as the birds depicted at the top center of the virtual background 604A, becoming visibly imperceptible. The decrease in resolution resulting in the virtual background 604B may result from decreasing a resolution of the virtual background 604A by a default value (e.g., incrementally scaling the resolution down one or more steps, such as from 720p to 480p, or to a lowest available resolution, such as 90p) or based on the specific bandwidth reduction affecting the conference participant associated with the composite image (i.e., the person depicted in the foreground 602). While the virtual background 604B is at a decreased resolution, the foreground 602 is at a same resolution as shown in FIG. 6A. Thus, the foreground 602 is not adjusted based on the bandwidth reduction.

Figure 6C:
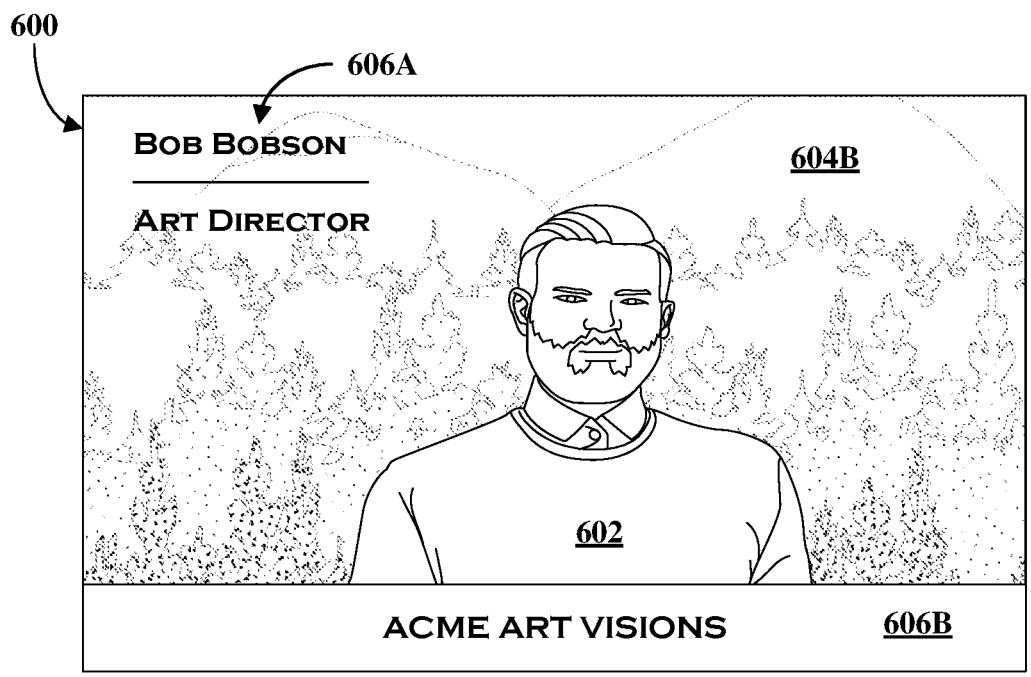
FIG. 6C is an illustration of an example of a composite image including a topmost layer, a foreground, a virtual background adjusted based on a detected bandwidth reduction.

FIG. 6C is an illustration of an example of the composite image 600 of FIG. 6A including a top layer, a middle layer, and a bottom layer adjusted based on a detected bandwidth reduction. As has been described, a composite image according to this disclosure may be referred to as having two or more layers. For example, the composite image 600 as shown in FIGS. 6A and 6B may be understood as having two layers, being a top layer including the foreground 602 and a bottom layer including either the virtual background 604A or the virtual background 604B. In FIG. 6C, the composite image 600 includes three layers, in which the bottom layer includes the virtual background 604B shown in FIG. 6B (i.e., a virtual background at a decreased resolution), the middle layer includes the foreground 602 shown in FIGS. 6A-B which overlays the bottom layer, and the top layer includes objects 606A and 606B which overlay both of the middle and bottom layers. In the example shown, the object 606A is text identifying a name and position of the conference participant depicted in the foreground 602, and the object 606B is a banner, appearing at a bottom of the composite image, including text identifying a name of a company with which the conference participant is associated.

Figure 7:
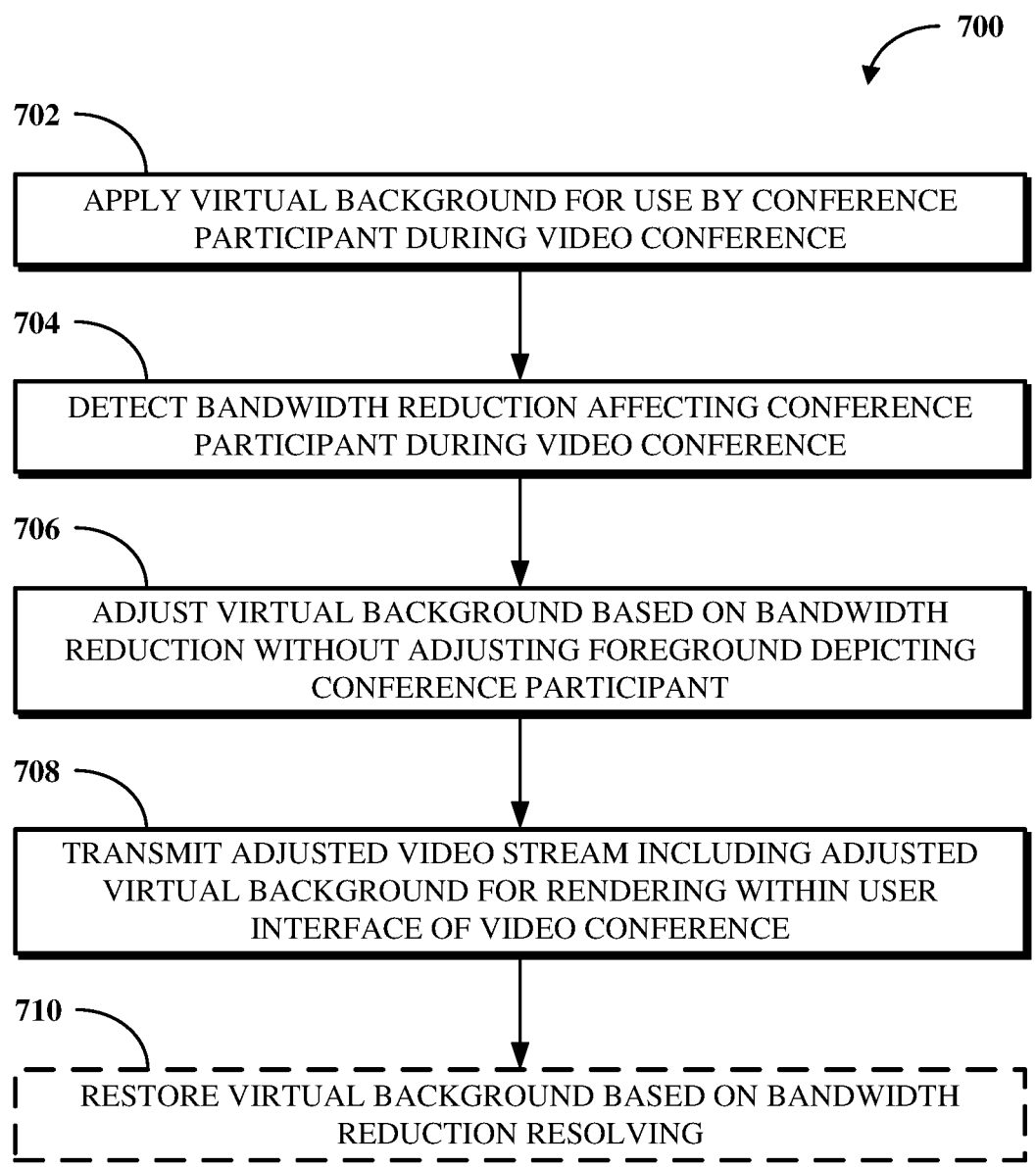
FIG. 7 is a flowchart of an example of a technique for adjusting a virtual background of a video stream based on a detected bandwidth reduction.

To further describe some implementations in greater detail, reference is next made to examples of techniques which may be performed by or using a system for detecting a bandwidth reduction affecting a conference participant and adjusting one or more portions of a video stream based on the bandwidth reduction. FIG. 7 is a flowchart of an example of a technique 700 for adjusting a virtual background of a video stream based on a detected bandwidth reduction. FIG.

8 is a flowchart of an example of a technique 800 for adjusting one or more portions of a video stream without an active virtual background based on a detected bandwidth reduction.

The technique 700 and/or the technique 800 can be executed using computing devices, such as the systems, hardware, and software described with respect to FIGS. 1-6C. The technique 700 and/or the technique 800 can be performed, for example, by executing a machine-readable program or other computer-executable instructions, such as routines, instructions, programs, or other code. The steps, or operations, of the technique 700 and/or the technique 800, or another technique, method, process, or algorithm described in connection with the implementations disclosed herein can be implemented directly in hardware, firmware, software executed by hardware, circuitry, or a combination thereof.

For simplicity of explanation, the technique 700 and the technique 800 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for adjusting a virtual background of a video stream based on a detected bandwidth reduction is shown. At 702, a virtual background is applied for use by a conference participant during a video conference. The conference participant is represented by a video stream that includes a virtual background and a foreground depicting the conference participant. The video stream is comprised of composite images produced by segmenting the foreground from initial images and combining the virtual background and the foreground. For example, using object detection software, the conference participant may be identified within a video frame captured using a camera of a computing device associated with the conference participant. A composite image may then be generated by combining the conference participant, as the foreground, with the virtual background. The composite image may then be transmitted along with other such composite images within the video stream for rendering within a user interface of the video conference.

At 704, a bandwidth reduction affecting the conference participant is detected. The bandwidth reduction affects the conference participant by limiting an amount of bandwidth available for a computing device (e.g., a client device) of the conference participant to connect to or otherwise access a software service implementing the video conference. For example, the bandwidth reduction may be detected based on network information, such as one or more of packet loss, round trip delay latency, or jitter affecting the video stream. In some cases, detecting the bandwidth reduction can include detecting that network information associated with a computing device of the conference participant is below a threshold, such as a minimum amount usable to indicate a bandwidth reduction affecting the ability of the conference participant to participate in the video conference instead of a temporary and/or insubstantial bandwidth fluctuation that does not affect the ability of the conference participant to participate in the video conference. In some cases, the threshold used to detect the bandwidth reduction may be selected based on an initial resolution of at least a portion of the video stream.

At 706, the virtual background is adjusted based on the bandwidth reduction without also adjusting the foreground. Adjusting the virtual background without also adjusting the foreground can include decreasing a resolution of the virtual background while maintaining a resolution of the foreground. For example, multiple resolution versions of the video stream may be produced for the video conference, such as using multi-stream capabilities of the video conference, and decreasing the resolution of the virtual background while maintaining the resolution of the foreground may include selecting, from amongst the multiple resolution versions, a resolution version of the virtual background corresponding to a resolution lower than the resolution of the foreground. In some cases, decreasing the resolution of the virtual background while maintaining the resolution of the foreground can include incrementally scaling the resolution of the virtual background based on the bandwidth reduction. For example, decreasing the resolution of the virtual background while maintaining the resolution of the foreground can include decreasing the resolution of the virtual background to a first decreased resolution, determining that the virtual background at the first decreased resolution fails to satisfy a bandwidth threshold, and decreasing the resolution of the virtual background from the first decreased resolution to a second decreased resolution. In some cases, an amount of the decrease to the resolution of the virtual background is based on an amount of the bandwidth reduction.

Adjusting the virtual background without also adjusting the foreground can also or instead include blurring the virtual background based on the bandwidth reduction. Where the virtual background initially includes motion, such as where the virtual background is a sequence of images rather than a single image, adjusting the virtual background without also adjusting the foreground can also or instead include using, as the virtual background, a static image of the virtual background omitting the motion. The static image may be randomly selected from amongst the images of the sequence of images. Alternatively, the static image may be a first image in the sequence of images, a key frame of the sequence of images, or another image of the sequence of images.

At 708, an adjusted video stream including the foreground and the adjusted virtual background is transmitted for rendering within a user interface of the video conference. For example, where adjusting the virtual background without also adjusting the foreground includes decreasing a resolution of the virtual background while maintaining a resolution of the foreground, the adjusted video stream may include the virtual background at the decreased resolution and the foreground at the maintained resolution.

Optionally, at 710, based on the bandwidth reduction affecting the conference participant resolving, the virtual background is restored. For example, network information associated with the computing device of the conference participant can be processed to determine that an amount of bandwidth available to the computing device for connecting to the video conference has increased from its reduced amount. The resolution of the virtual background can be restored (e.g., to the original resolution of the virtual background prior to the detection of the bandwidth reduction) based on the bandwidth of the computing device increasing. In some cases, the restoration of the resolution of the virtual background can be based on the bandwidth of the computing device returning to a threshold range. In some cases, the restoration of the resolution of the virtual background can be based on the bandwidth of the computing device returning to or increasing by a specific amount.

In some implementations, where the video stream includes more than two layers (e.g., more than a foreground and a virtual background), adjustments may in some cases be made to a layer other than the layers representing the foreground and virtual background. For example, where the video stream includes a top layer above the foreground, adjusting the virtual background without adjusting the foreground (e.g., decreasing the resolution of the virtual background while maintaining the resolution of the foreground) can include maintaining a resolution of the top layer or decreasing the resolution of the top layer.

Figure 8:
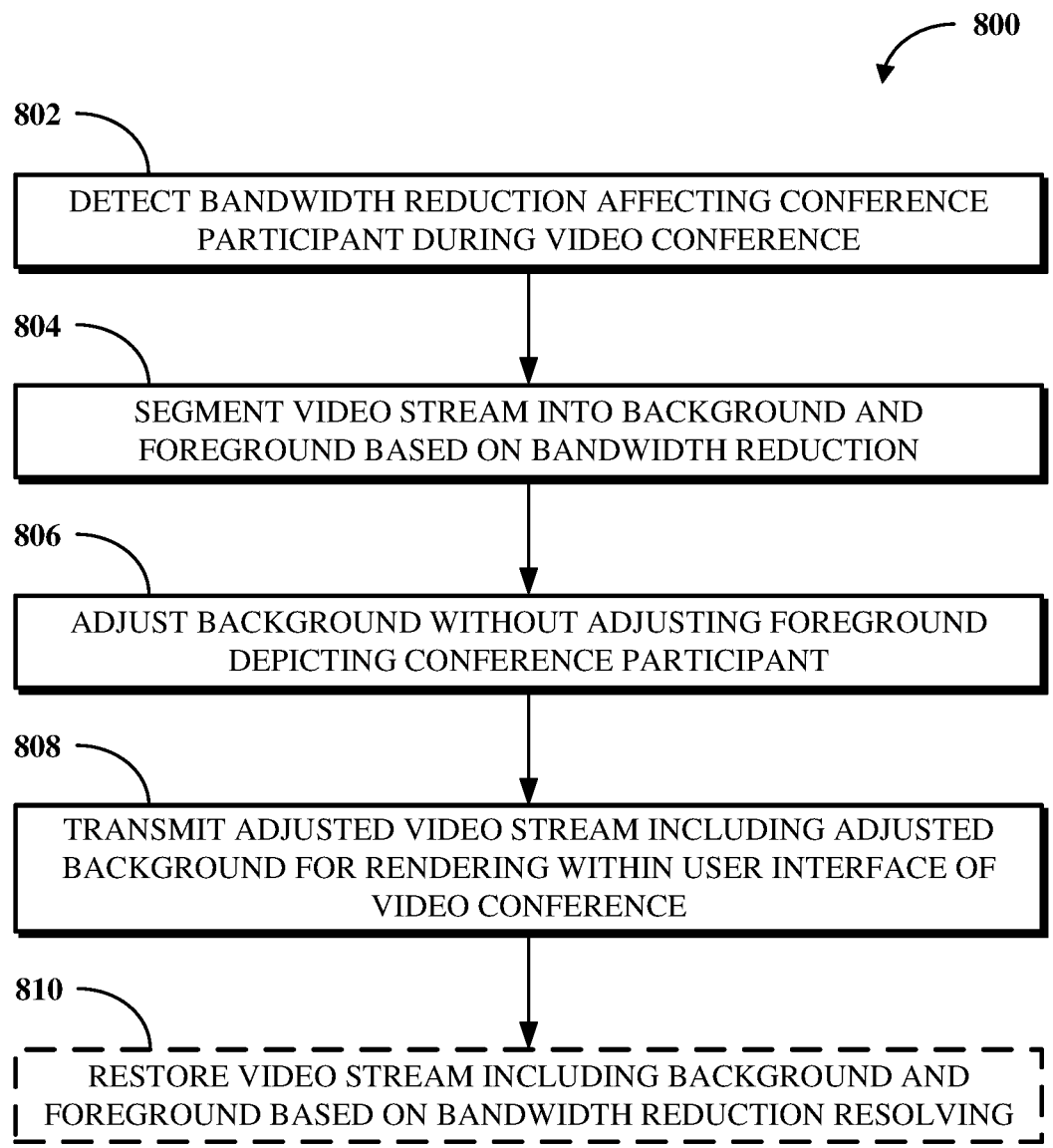
FIG. 8 is a flowchart of an example of a technique for adjusting one or more portions of a video stream without an active virtual background based on a detected bandwidth reduction.

Referring next to FIG. 8, the technique 800 for adjusting one or more portions of a video stream without a virtual background based on a detected bandwidth reduction is shown. At 802, a bandwidth reduction affecting a conference participant is detected during a video conference. As described above with respect to FIG. 7, the bandwidth reduction affects the conference participant by limiting an amount of bandwidth available for a computing device (e.g., a client device) of the conference participant to connect to or otherwise access a software service implementing the video conference. For example, the bandwidth reduction may be detected based on network information, such as one or more of packet loss, round trip delay latency, or jitter affecting the video stream. In some cases, detecting the bandwidth reduction can include detecting that network information associated with a computing device of the conference participant is below a threshold, such as a minimum amount usable to indicate a bandwidth reduction affecting the ability of the conference participant to participate in the video conference instead of a temporary and/or insubstantial bandwidth fluctuation that does not affect the ability of the conference participant to participate in the video conference. In some cases, the threshold used to detect the bandwidth reduction may be selected based on an initial resolution of at least a portion of the video stream.

At 804, based on the detected bandwidth reduction, the video stream is segmented into a background and a foreground. The foreground depicts the conference participant and thus represents a portion of images of the video stream that includes pixel information representative of the conference participant. The background corresponds to the remaining portion of the images of the video stream. Segmenting the video stream into the background and the foreground can include using object detection software to identify a human object (i.e., the conference participant) within images of the video stream, identifying a portion of the images which include video data corresponding to that human object as the foreground, and identifying the remaining portion of the images as the background.

In some cases, segmenting the video stream into the background and the foreground includes using the background from one image of the video stream as the background for all images of the video stream. For example, because the scene behind the conference participant may in some cases change during the video conference (e.g., where the conference participant connects to the video conference from a mobile device and moves around within some physical space during the video conference), a single image may be selected and a background portion thereof used as the background for all of the video stream. The single image may be selected based on the image having a lowest encoding throughput of a subset of evaluated frames of the video stream. Alternatively, the single image may be selected as the first image captured after the detection of the bandwidth reduction. In some cases, segmenting the video stream into the background and the foreground includes replacing the background with a static image other than from the video stream. For example, an image usable as a virtual background or a solid color image may be used as the background for the images of the video stream.

At 806, the background is adjusted without also adjusting the foreground. As described with respect to FIG. 7, adjusting the background without also adjusting the foreground can include decreasing a resolution of the background while maintaining a resolution of the foreground. For example, multiple resolution versions of the video stream may be produced for the video conference, such as using multi-stream capabilities of the video conference, and decreasing the resolution of the background while maintaining the resolution of the foreground may include selecting, from amongst the multiple resolution versions, a resolution version of the background corresponding to a resolution lower than the resolution of the foreground. In some cases, decreasing the resolution of the background while maintaining the resolution of the foreground can include incrementally scaling the resolution of the background based on the bandwidth reduction. For example, decreasing the resolution of the background while maintaining the resolution of the foreground can include decreasing the resolution of the background to a first decreased resolution, determining that the background at the first decreased resolution fails to satisfy a bandwidth threshold, and decreasing the resolution of the background from the first decreased resolution to a second decreased resolution. In some cases, an amount of the decrease to the resolution of the background is based on an amount of the bandwidth reduction. Adjusting the background without also adjusting the foreground can also or instead include blurring the background based on the bandwidth reduction.

At 808, an adjusted video stream including the foreground and the adjusted background is transmitted for rendering within a user interface of the video conference. For example, where adjusting the background without also adjusting the foreground includes decreasing a resolution of the background while maintaining a resolution of the foreground, the adjusted video stream may include the background at the decreased resolution and the foreground at the maintained resolution.

Optionally, at 810, based on the bandwidth reduction affecting the conference participant resolving, the video stream including the background and the foreground is restored. For example, network information associated with the computing device of the conference participant can be processed to determine that an amount of bandwidth available to the computing device for connecting to the video conference has increased from its reduced amount. The resolution of the entire video stream (i.e., including the background and the foreground) can be restored (e.g., to the original resolution of the video stream prior to the detection of the bandwidth reduction) based on the bandwidth of the computing device increasing. In some cases, the restoration of the resolution of the video stream can be based on the bandwidth of the computing device returning to a threshold range. In some cases, the restoration of the resolution of the video stream can be based on the bandwidth of the computing device returning to or increasing by a specific amount.

In some implementations, where the video stream includes an additional layer (e.g., a layer including text, images, or other objects above the video stream, and thus above the foreground when the video stream is segmented), adjustments may in some cases be made to the additional layer in addition to or instead of to the background. For example, adjusting the background without adjusting the foreground (e.g., decreasing the resolution of the background while maintaining the resolution of the foreground) can include maintaining a resolution of the additional layer or decreasing the resolution of the additional layer.

The implementations of this disclosure correspond to methods, non-transitory computer readable media, apparatuses, systems, devices, and the like. In some implementations, a method comprises, during a video conference, detecting a bandwidth reduction affecting a conference participant represented by a video stream without a virtual background; based on the bandwidth reduction, segmenting the video stream into a background and a foreground, wherein the foreground depicts the conference participant; decreasing a resolution of the background while maintaining a resolution of the foreground; and transmitting, for rendering within a user interface of the video conference, an adjusted video stream including the background at the decreased resolution and the foreground at the maintained resolution. In some implementations, a non-transitory computer readable medium stores instructions operable to cause one or more processors to perform operations comprising, during a video conference, detecting a bandwidth reduction affecting a conference participant represented by a video stream without a virtual background; based on the bandwidth reduction, segmenting the video stream into a background and a foreground, wherein the foreground depicts the conference participant; decreasing a resolution of the background while maintaining a resolution of the foreground; and transmitting, for rendering within a user interface of the video conference, an adjusted video stream including the background at the decreased resolution and the foreground at the maintained resolution. In some implementations, an apparatus comprises a memory and a processor configured to execute instructions stored in the memory to, during a video conference, detect a bandwidth reduction affecting a conference participant represented by a video stream without a virtual background; based on the bandwidth reduction, segment the video stream into a background and a foreground, wherein the foreground depicts the conference participant; decrease a resolution of the background while maintaining a resolution of the foreground; and transmit, for rendering within a user interface of the video conference, an adjusted video stream including the background at the decreased resolution and the foreground at the maintained resolution.

In some implementations of the method, non-transitory computer readable medium, or apparatus, the method comprises, the operations comprise, and the processor is configured to execute the instructions for restoring the video stream including the background and the foreground to an original resolution based on a bandwidth of a computing device associated with the conference participant returning to a threshold range.

In some implementations of the method, non-transitory computer readable medium, or apparatus, the bandwidth reduction is detected based on one or more of packet loss, round trip delay latency, or jitter affecting the video stream.

In some implementations of the method, non-transitory computer readable medium, or apparatus, an amount of the decrease to the resolution of the background is based on an amount of the bandwidth reduction.

In some implementations of the method, non-transitory computer readable medium, or apparatus, segmenting the video stream into the background and the foreground comprises using the background from one image of the video stream as the background for all images of the video stream.

In some implementations of the method, non-transitory computer readable medium, or apparatus, segmenting the video stream into the background and the foreground comprises replacing the background with a static image other than from the video stream.

In some implementations of the method, non-transitory computer readable medium, or apparatus, the method comprises, the operations comprise, and the processor is configured to execute the instructions for blurring the background based on the bandwidth reduction.

In some implementations of the method, non-transitory computer readable medium, or apparatus, multiple resolution versions of the video stream are produced for the video conference, and decreasing the resolution of the background while maintaining the resolution of the foreground comprises selecting, from amongst the multiple resolution versions, a resolution version of the background corresponding to a resolution lower than the resolution of the foreground.

In some implementations of the method, non-transitory computer readable medium, or apparatus, the method comprises, the operations comprise, and the processor is configured to execute the instructions for detecting, during the video conference, that the bandwidth reduction has resolved; and restoring the video stream including the background and the foreground to an original resolution.

In some implementations of the method, non-transitory computer readable medium, or apparatus, based on the bandwidth reduction, the background segmented from one image of the video stream is used as the background for all images of the video stream.

In some implementations of the method, non-transitory computer readable medium, or apparatus, the video stream includes a top layer above the foreground, and decreasing the resolution of the background while maintaining the resolution of the foreground comprises maintaining a resolution of the top layer.

In some implementations of the method, non-transitory computer readable medium, or apparatus, detecting the bandwidth reduction comprises detecting that network information associated with a computing device of the conference participant is below a threshold.

In some implementations of the method, non-transitory computer readable medium, or apparatus, decreasing the resolution of the background while maintaining the resolution of the foreground comprises incrementally scaling the resolution of the background based on the bandwidth reduction.

In some implementations of the method, non-transitory computer readable medium, or apparatus, a threshold used to detect the bandwidth reduction is selected based on an initial resolution of at least a portion of the video stream.

In some implementations of the method, non-transitory computer readable medium, or apparatus, the video stream includes a top layer above the foreground, and decreasing the resolution of the background while maintaining the resolution of the foreground comprises decreasing a resolution of the top layer.

In some implementations of the method, non-transitory computer readable medium, or apparatus, the method comprises, the operations comprise, and the processor is configured to execute the instructions for selecting a static image other than from the video stream; and replacing the background with the static image.

In some implementations of the method, non-transitory computer readable medium, or apparatus, decreasing the resolution of the background while maintaining the resolution of the foreground comprises decreasing the resolution of the background to a first decreased resolution; determining that the background at the first decreased resolution fails to satisfy a bandwidth threshold; and decreasing the resolution of the background from the first decreased resolution to a second decreased resolution.

In some implementations of the method, non-transitory computer readable medium, or apparatus, the resolution of the background is decreased by a client application connecting a computing device associated with the conference participant to a software service implementing the video conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   during a video conference, receiving, by a server device, a received video stream of a conference participant from a client device of the conference participant;
   detecting, by the server device, a bandwidth reduction affecting the client device;
   based on the bandwidth reduction, segmenting, by the server device, the received video stream into a background and a foreground, wherein the foreground depicts the conference participant;
   selecting, by the server device, a single image from the background of one frame of the received video stream to use as the background for frames of the received video stream;
   applying, by the server device, the single image as the background to the received video stream to obtain an adjusted video stream; and
   transmitting, by the server device, the adjusted video stream for rendering within a user interface of the video conference.

2. The method of claim 1, comprising:
   restoring the received video stream for rendering within the user interface of the video conference based on a bandwidth of the client device associated with the conference participant returning to a threshold range.

3. The method of claim 1, wherein the bandwidth reduction is detected based on one or more of packet loss, round trip delay latency, or jitter affecting the received video stream.

4. The method of claim 1,
   wherein the single image is a blurred background of the one frame of the received video stream.

5. A non-transitory computer readable medium storing instructions operable to cause one or more processors to perform operations comprising:
   during a video conference, receiving, by a server device, a received video stream of a conference participant from a client device of the conference participant;
   detecting, by the server device, a bandwidth reduction affecting the client device;
   based on the bandwidth reduction, segmenting, by the server device, the received video stream into a background and a foreground, wherein the foreground depicts the conference participant;
   selecting, by the server device, a single image from the background of one frame of the received video stream to use as the background for frames of the received video stream;
   applying, by the server device, the single image as the background to the received video stream to obtain an adjusted video stream; and transmitting, by the server device, the adjusted video stream for rendering within a user interface of the video conference.

6. The non-transitory computer readable medium of claim 5, the operations comprising:
detecting, during the video conference, that the bandwidth reduction has resolved; and
restoring the received video stream for rendering within the user interface of the video conference.

7. The non-transitory computer readable medium of claim 5, wherein the received video stream includes a top layer above the foreground, and wherein
a resolution of the top layer is maintained during the bandwidth reduction.

8. The non-transitory computer readable medium of claim 5, wherein the operations for detecting the bandwidth reduction comprise:
detecting that network information associated with the client device of the conference participant is below a threshold.

9. An apparatus, comprising:
a memory; and
a processor configured to execute instructions stored in the memory to:
during a video conference, receive, by a server device, a received video stream of a conference participant from a client device of the conference participant;
detect, by the server device, a bandwidth reduction affecting the client device;
based on the bandwidth reduction, segment, by the server device, the received video stream into a background and a foreground, wherein the foreground depicts the conference participant;
select, by the server device, a single image from the background of one frame of the received video stream to use as the background for frames of the received video stream;
apply, by the server device, the single image as the background to the received video stream to obtain an adjusted video stream; and
transmit, by the server device, the adjusted video stream for rendering within a user interface of the video conference.

10. The apparatus of claim 9, wherein a threshold used to detect the bandwidth reduction is selected based on an initial resolution of at least a portion of the received video stream.

11. The apparatus of claim 9, wherein the received video stream includes a top layer above the foreground, and wherein
a resolution of the top layer is decreased during the bandwidth reduction.

12. The apparatus of claim 9, wherein
the single image is a first image of the received video stream captured after detecting the bandwidth reduction.

13. The apparatus of claim 9, wherein the processor is configured to execute the instructions to:
decrease a resolution of the background to a first decreased resolution;
determine that the background at the first decreased resolution fails to satisfy a bandwidth threshold; and
apply the single image as the background in response to determining that the bandwidth threshold is not satisfied.

14. The method of claim 1, wherein the single image is selected based on the single image having a lowest encoding throughput of a subset of evaluated frames of the received video stream.

15. The method of claim 1, wherein the single image is a first frame of the received video stream after the bandwidth reduction is detected.

16. The method of claim 1, wherein the single image is a key frame of the received video stream.

17. The method of claim 1, wherein the bandwidth reduction is received by the server device from the client device.

18. The method of claim 1, wherein the bandwidth reduction is detected by the server device.

19. The apparatus of claim 9, wherein the single image is selected based on the single image having a lowest encoding throughput of a subset of evaluated frames of the received video stream.

20. The apparatus of claim 9, wherein the single image is a first frame of the received video stream after the bandwidth reduction is detected.

* * * * *